US011295380B2

(12) United States Patent
Mack

(10) Patent No.: US 11,295,380 B2
(45) Date of Patent: *Apr. 5, 2022

(54) METHOD AND SYSTEM FOR TRACKING PERSONAL PROPERTY COLLATERAL

(71) Applicant: Crediot, Inc., Las Vegas, NV (US)

(72) Inventor: Steven Mack, Las Vegas, NV (US)

(73) Assignee: Crediot, Inc., Las Vegas, NV (US)

( * ) Notice: Subject to any disclaimer, the term of this patent is extended or adjusted under 35 U.S.C. 154(b) by 148 days.

This patent is subject to a terminal disclaimer.

(21) Appl. No.: 16/811,163

(22) Filed: Mar. 6, 2020

(65) Prior Publication Data

US 2020/0211104 A1 Jul. 2, 2020

Related U.S. Application Data

(63) Continuation-in-part of application No. 15/951,797, filed on Apr. 12, 2018, now Pat. No. 10,664,909, which is a continuation of application No. 14/607,266, filed on Jan. 28, 2015, now Pat. No. 9,978,100.

(51) Int. Cl.
 *G06Q 40/02* (2012.01)
(52) U.S. Cl.
 CPC .................................. *G06Q 40/025* (2013.01)
(58) Field of Classification Search
 CPC ..................................................... G06Q 40/025
 See application file for complete search history.

(56) References Cited

U.S. PATENT DOCUMENTS

| | | | |
|---|---|---|---|
| 7,946,485 | B2 | 5/2011 | Silverbrook et al. |
| 8,533,062 | B2 | 9/2013 | Sauerwein |
| 2008/0042868 | A1 | 2/2008 | Lee et al. |
| 2008/0086410 | A1 | 4/2008 | MacGuire |
| 2010/0176933 | A1 | 7/2010 | Barragan Trevino et al. |
| 2010/0217697 | A1 | 8/2010 | MacGuire |
| 2011/0288969 | A1 | 11/2011 | Wiech |
| 2012/0130909 | A1 | 5/2012 | Corn |
| 2012/0226574 | A1 | 9/2012 | Sauerwein |
| 2013/0132268 | A1 | 5/2013 | Cooper et al. |
| 2013/0297487 | A1 | 11/2013 | MacGuire |
| 2014/0006225 | A1 | 1/2014 | Bowman et al. |
| 2014/0032391 | A1 | 1/2014 | Kapur et al. |
| 2014/0032407 | A1 | 1/2014 | Kapur et al. |
| 2014/0279397 | A1 | 9/2014 | Schmidt et al. |

(Continued)

OTHER PUBLICATIONS

Search Report and Written Opinion for PCT Patent Application No. PCT/US2021/019537, dated May 7, 2021, 11 pages.

*Primary Examiner* — Scott S Trotter
(74) *Attorney, Agent, or Firm* — Weide & Miller, Ltd.

(57) ABSTRACT

A tracking and recording system is provided for tracking and documenting personal property. Personal property, such as electronic or "IOT" devices having a communication interface, are placed in communication with a tracking system which receives information from those items of personal property and utilizes that information to verify the location and/or existence of the property. A record of the personal property may also be created which includes information which identifies the property, liens, transfers of ownership, and verifications of the location of the property. The record may comprise a block chain of information regarding the property.

16 Claims, 5 Drawing Sheets

(56) References Cited

U.S. PATENT DOCUMENTS

| | | | |
|---|---|---|---|
| 2016/0098723 A1* | 4/2016 | Feeney | G06Q 20/065 |
| | | | 705/75 |
| 2016/0300234 A1 | 10/2016 | Moss-Pultz et al. | |
| 2016/0337354 A1* | 11/2016 | Smadja | H04W 4/70 |
| 2017/0046651 A1 | 2/2017 | Lin et al. | |
| 2018/0232804 A1 | 8/2018 | Mack | |

* cited by examiner

METHOD AND SYSTEM FOR TRACKING PERSONAL PROPERTY COLLATERAL

RELATED APPLICATION DATA

This application is a continuation-in-part of U.S. application Ser. No. 15/951,797, filed Apr. 12, 2018, now U.S. Pat. No. 10,664,909, which is a continuation of U.S. application Ser. No. 14/607,266, filed Jan. 28, 2015, now U.S. Pat. No. 9,978,100, which prior applications are incorporated by reference herein in their entirety.

FIELD OF THE INVENTION

The present invention relates to the identification and tracking of personal property.

BACKGROUND OF THE INVENTION

Personal property is more prevalent than real property. In addition, a greater number of problems exist with tracking and verifying personal property than exist with real property, mainly owing to the fact that personal property is generally movable, while real property is not. Thus, the status or condition of real property can generally be easily confirmed by simply travelling to the location of the real property and inspecting it. Further, convenient title systems exist for registering ownership of real property, thus allowing parties to confirm ownership, record liens and the like.

These systems don't work well for personal property. For example, if a lender lends money to a consumer for the purchase of a television in California, the lender might seek to provide a notice of lien on that property in California. However, the consumer might move to Florida and take their television with them. They might then sell or pawn the television without the buyer or new lender being aware that the television is subject to a prior lien.

Pawn lenders have addressed this problem by requiring that the borrower turn over the personal property into their possession until the loan is paid in full. This is inconvenient for both the lender and the borrower, however. First, this requires the borrower to bring the collateral to the lender (some of which can be difficult to transport). Second, it requires that the lender expend resources to track and store the collateral, such as at a warehouse. Third, while the collateral is in the possession of the lender, it is not available for use by the borrower. This may deter the borrower from pawning their collateral in the first instance since during the time the collateral is pawned, they can't enjoy the use of the collateral at all.

Other similar problems exist relative to tracking and validating ownership of personal property. For example, an insurance company may agree to insure the personal property of an insured. However, the insurance company will generally do so without confirming the existence of the personal property it is insuring. Even if the insurance company does, the insured might again sell or destroy the property without the knowledge of the insurance company. Thereafter, the insured might make a claim of loss, without the insurance company being able to confirm that personal property was actually destroyed in the loss event.

As another example, it is difficult to track and recover stolen personal property given that it can easily be transported and stored. For example, once a television is stolen from a person's home, there is no way to track the television beyond finding the television (such as if the burglar attempts to sell or pawn the television) and physically confirming the serial number (assuming the original owner kept serial number information for the television).

New solutions are desired to these and other problems associated with personal property

SUMMARY OF THE INVENTION

Aspects of the invention comprise systems and methods for tracking personal property and creating records regarding personal property. In one embodiment, the items of personal property may comprise collateral to a loan.

In one embodiment of a system, items of personal property are placed in communication with a tracking system, such as personal property or collateral tracking system. In a preferred embodiment, the items of personal property comprise electronic devices or other devices which include a communication interface which allows them to communicate with other devices. The communication interface might comprise, for example, a built-in wired or wireless communication interface which allows the device to be connected to a home computer or home network.

The personal property may communicate with the tracking system via a personal property reporting device or via a communication interface or device. For example, a personal property reporting device may comprise an owner or borrower's computer or other communication device, such as via a wireless access point or interface to the borrower's computer. As another example, the personal property may communicate with a communication interface or device, such as a router, which in turn links via one or more communication links to the tracking system.

A tracking system is configured to receive information from the items of personal property, such as via the owner or borrower's reporting device or the communication interfaces or devices. The tracking system may comprise computing devices, such as one or more servers. The tracking system may include one or more databases which store owner/borrower account information, including personal property information which is used to verify the personal property associated with the owner/borrower's reporting device.

In one embodiment of a method, a borrower may apply for a loan from a lender. The borrower may identify one or more items of collateral which may be used to at least partially secure the loan. The collateral might be identified by the borrower or it might be identified by using the tracking system to poll the borrower's collateral reporting device for potential items of collateral.

The borrower places items of collateral in communication with the tracking system. The lender may utilize the tracking system to receive information from the borrower's collateral and/or communicate with the borrower's collateral (directly through a communication interface or device or via the consumer's reporting device) regarding items of collateral. If the collateral which is used to secure the loan is identified, the collateral is verified as being secure. If items of collateral which are used to secure the loan are not identified, such as because the borrower sold or moved the items so that they are no longer in communication with the tracking system, the lender may contact the borrower, such as to call in the loan or obtain other collateral as security for the loan.

In one embodiment, the system of the invention may include or be implemented, at least in part, by a personal property reporting application which is downloaded on the owner or borrower's reporting device. The reporting application may comprise computer executable program code which is used to facilitate tracking of personal property and reporting of such property, such as to a lender's tracking system. In other embodiments, the system may be implemented by a consumer providing home network or communication interface/device access information which allows the tracking system to communicate with the personal property via that network or those devices (enabling the tracking system to receive information from the personal property and/or transmit information to the collateral).

Another embodiment of the invention comprises a method and system for creating personal property records. Such records may be used to confirm, track and/or record the existence, status (current ownership, liens, etc.) and/or other information regarding personal property, such as information regarding the location of personal property. The records may comprise blocks of a blockchain. In such a configuration, the records may comprise a genesis block and one or more subsequent blocks of information. The blocks may contain information which identifies the personal property, such as information regarding the make, model, serial number, date of manufacture, unique identifier, etc., for the item of personal property, information regarding ownership or changes in ownership, information regarding liens or various other information. Preferably, the record, such as one or more of the blocks of the blockchain, includes information regarding the location of the property at one or more times, such as determined using the personal property tracking method and system of the invention.

The methods and systems of the invention have numerous benefits, including for use by manufacturers, vendors, consumers, law enforcement, lenders and insurance companies, in tracking personal property (including used as collateral or subject to insurance coverage), and confirming information regarding the property (such as current owner, liens, etc.)

Further objects, features, and advantages of the present invention over the prior art will become apparent from the detailed description of the drawings which follows, when considered with the attached figures.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is a method and system for tracking personal property, such as personal property which is used as collateral for a loan.

Figure 1:
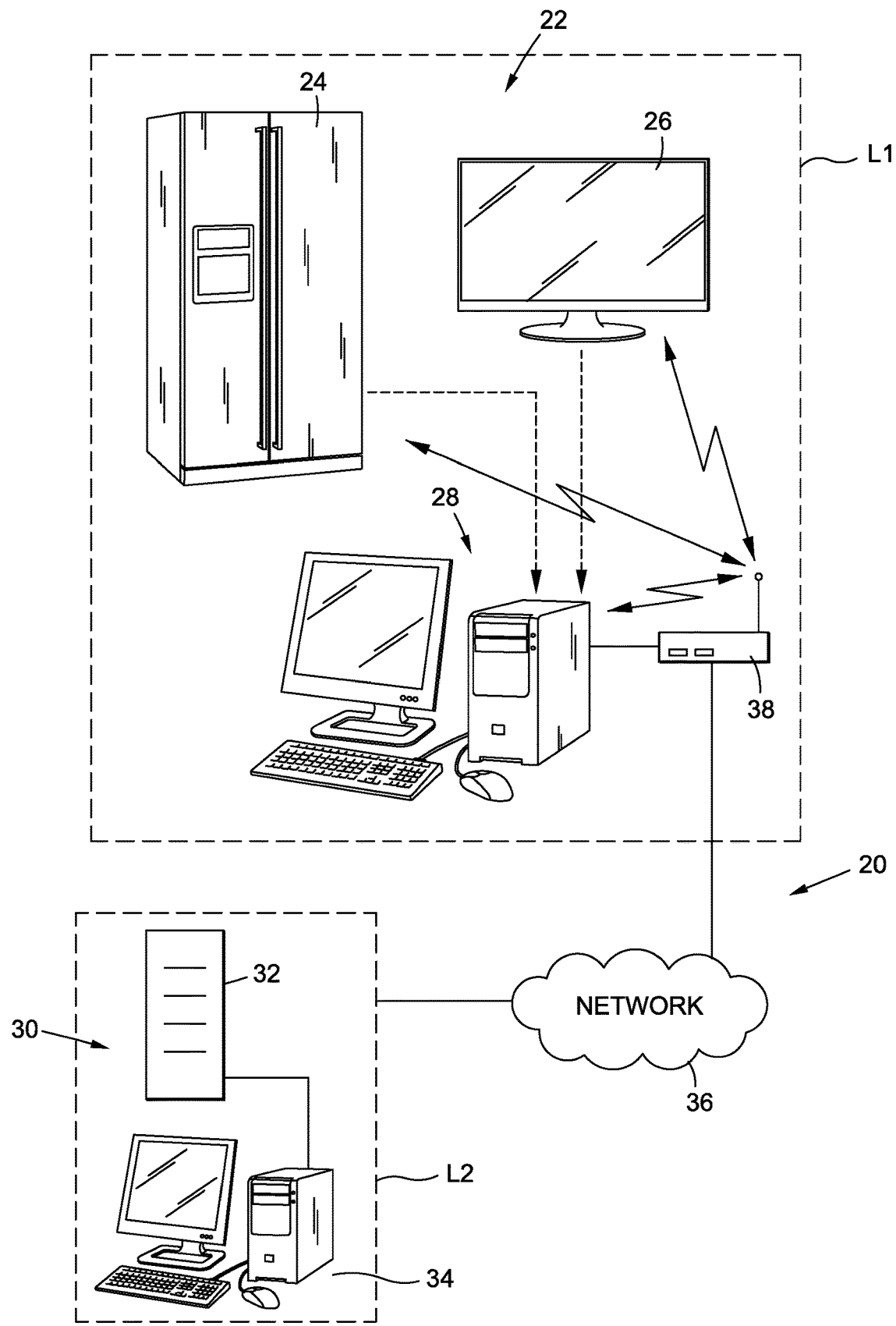
FIG. 1 is an overview of a system in accordance with one embodiment of the invention.
Figure 2:
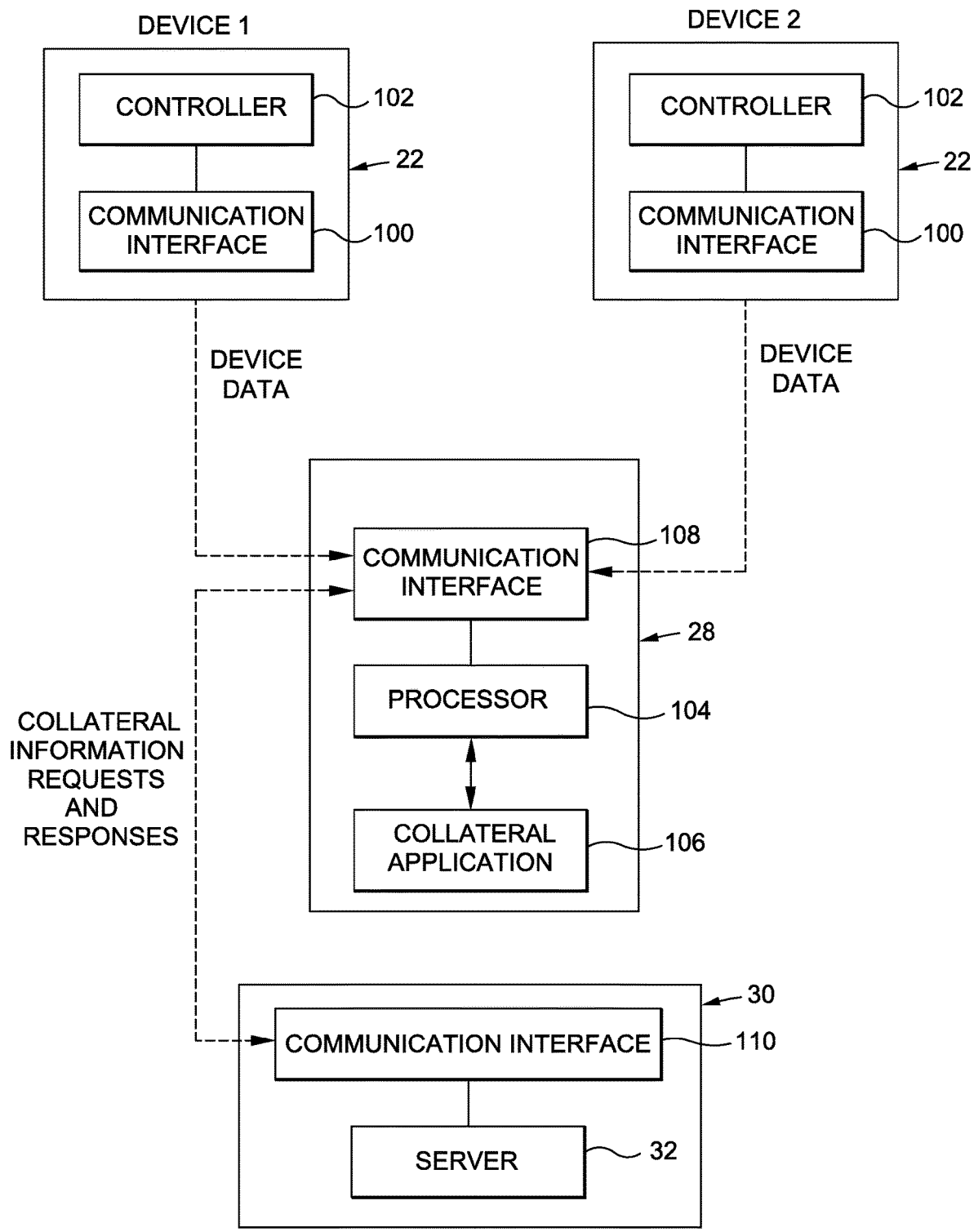
FIG. 2 is a diagram which illustrates more detail of the system illustrated in FIG. 1.

One embodiment of a system 20 of the invention will be described with reference to FIGS. 1 and 2. FIGS. 1 and 2 illustrate a system 20 for tracking personal property.

As illustrated in FIG. 1, one or more items of personal property 22 are located at a first location L1. The items of personal property 22 may vary. The personal property 22 may comprise a wide range of devices, including those known as "Internet Of Things" ("IOT") devices or "smart" devices. As illustrated, one of the items comprises a refrigerator 24 and another item comprises a television 26, but such might comprise other electronics or electronic devices such as, but not limited to, a toaster, blender, oven, microwave, dishwasher or other kitchen appliance; computing or telecommunication devices such as a computer, phone, PDA, tablet, etc., other household electronics or appliances such as washers, dryers, VCRs, DVD players, etc., or even non-electronic items such as furnishings, household goods, tools, clothing, etc., so long as those goods are capable of providing the functionality as described below (either in their native configuration or as modified). The personal property 22 could also include vehicles and other forms of transportation and equipment.

The one or more first locations L1 might comprise, for example, a person's home or a business office, among other places.

In a preferred embodiment, information is exchanged between the personal property 22 and one or more tracking systems or devices 30. The tracking system 30 may comprise, for example, one or more servers 32 and one or more associated work stations 34 or other associated devices. The one or more tracking systems 30 are preferably located at a second location L2. The second location L2 may be remote from the first location L1. For example, the tracking system 30 may be operated by a lender, such as a bank or the like, and thus be located at the lender's location.

Information regarding the personal property 22 may be collected by or provided to the tracking system 30 in various manners. In one embodiment, information is exchanged between the personal property 22 and one or more reporting devices 28, and the reporting devices 28 then provide or communicate information to the tracking system 30. In a preferred embodiment, the reporting device 28 comprises a computing device, such as a desktop or laptop computer, tablet, phone, PDA, or the like (wherein such devices may include a processor, a memory for storing machine-readable code for execution by the processor or "software", such as in the form of an app, and wherein the software is configured to cause the processor to implement features of the invention as described herein). In other embodiments, as described below, direct communications may occur between the tracking system 30 and one or more of the items of personal property 22 or communication might occur between the tracking system and the items of personal property via other types of devices, such as other interfaces.

As described in more detail below, the reporting devices 28 may be configured to collect information regarding one or more items of personal property 22 and report information regarding the personal property 22 (e.g. transmit information) to the tracking system 30. This reporting, as well as any requests or information transmitted from the tracking system 30 to the reporting devices 28, is transmitted over one or more communication links 36. These communication links may be wired, wireless or a combination thereof, comprise or include local or wide area networks (LANs or WANs), and be public and/or private. For example, the communication link 36 might comprise or include the Internet.

Additional details of the invention will be described with reference to FIG. 2. In a preferred embodiment, each item of personal property 22 includes at least one communication interface 100. The communication interface 100 is configured to, at a minimum, transmit information to a remote location or device. In one embodiment, the communication interface 100 is configured to transmit and receive information.

The communication interface 100 may be configured to transmit and receive information over a wired or wireless communication link, and may be configured transmit information or data in various formats in accordance with various protocols. In the preferred embodiment of the invention, the communication interface 100 is configured to transmit information wirelessly. The communications interface 100 might communicate data via a wireless communication link such as via 3G, 4G, 5G, IMT, GSM or the like, or by TCP/IP, Bluetooth, 802.11xx and the like. However, the communication link between the item of personal property 22 and the reporting device 28 might be a wired, rather than wireless, communication link (such as via an existing power supply path, Ethernet, USB, etc.)

In one embodiment, the communication interface 100 may include or be associated with a controller 102. The controller 102 may be configured to generate response information, communicate with other devices, and receive input and the like. The controller 102 might comprise hardware and/or software, such as comprising a processor having an associated memory for storing data and/or machine executable program code.

In one embodiment, the controller 102 and communication interface 100 may be part of an existing device. For example, a television may include a controller 102 for controlling the various functions thereof and a communication interface 100 for transmitting and/or receiving data. In a preferred embodiment, as described in detail below, the controller 102 is configured to generate identification information which is transmitted by the communication interface 100.

In one embodiment of the invention, information regarding one or more items of personal property 22 is collected by at least one reporting device 28. As indicated above, the reporting device 28 might comprise, for example, a home laptop or desk top computer or other computing device such as a tablet, PDA or the like.

As illustrated in FIG. 2, the reporting device 28 may comprise a computing device (such as a laptop or desktop computer or a phone/PDA/tablet) which includes a processor 104 for executing instructions, a memory for storing data such as instructions 106, and at least one communication interface 108. The communication interface 108 is preferably configured to receive data or information from the items of personal property 22, such as transmitted by the communication interface 100 thereof. In addition, the communication interface 108 is configured to transmit information to and/or receive information from one or more other devices, and particularly the one or more tracking systems 30. As a result, while the communication interface(s) 108 of the reporting device 28 may communicate via wired or wireless links and using a variety of communication protocols, preferably the communication interface(s) 108 are configured to provide compatible communications with those devices. For example, in one embodiment, the communication interface 108 might include a wireless communication interface which permits the reporting device 28 (such as the computer) to communicate directly with a wireless network or the like. In other embodiments, such as illustrated in FIG. 1, the communication interface 108 might send information to and receive information from various other devices, such as communication interfaces or devices 38 such as a wireless access point or router (which devices in turn communicate via one or more other devices or communication links to the tracking system 30). As another example, the communication interface 108 might comprise a USB controller which allows the computer to communicate with linked USB devices, a Bluetooth communication interface for communicating with BLE devices, etc.

Communications may be established between the items of personal property 22 and the reporting device 28 in various manners. For example, an electronic device such as television, DVD player, refrigerator or the like may include a wireless communication interface. Via a menu of the device, the user of the device may search out other devices or networks, such as to place the device in wireless communication with those devices or networks. As one example, a user might have a wireless home network having one or more wireless access points, routers, switches or the like, and other associated devices. By connecting the electronic device to such a network, the device may be placed in communication with the user's computer (or other reporting device). In other configurations, the devices might be directly linked (in peer to peer configuration).

In one embodiment, the item of personal property 22 may be a true IOT device in that the item has a communication interface and an IP address (whether static or dynamic) which is unique to the device, thus allowing the device to be uniquely addressed/recognized on the Internet and transmit and/or receive information via the Internet directly using the TCP/IP communication protocol. On the other hand, the item of personal property 22 might comprise a linked or controlled IOT type device. For example, the item might be configured as a Bluetooth (including Bluetooth Low Energy or "BLE") device, a WiFi device, a ZigBee device, a Message Queue Telemetry Transport ("MQTT") device, a Constrained Application Protocol ("CoAP") device, a data distribution service ("DDS") device, a Near Field Communication ("NFC") device, a cellular device (including GSM, 3G/4G/5G), an Advanced Messaging Queuing Protocol ("AMQP") device, a Long Ranged Wide Area Network ("LoRaWAN") device, a Radio Frequency Identification ("RFID"), a Z-Wave device, a SigFox device, a Thread device, an EnOcean device, or other type of device now existing or later created. Such devices may communicate via protocols different than the standard Internet TCP/IP protocol and may thus not have an IP address, and thus cannot communicate directly via the Internet. Such devices may instead communicate with a communication interface, whether such is part of a reporting device 28 comprising a computer or a separate interface, such as a Z-Wave or ZigBee interface or controller. In such a configuration, the item of personal property 22 preferably again has a unique identifier, but that identifier may comprise an identifier other than an IP address, such as a unique address for the particular communication protocol the device utilizes (such as a unique RFID tag, etc.). In such a configuration, the tracking system 30 may communicate with the item of personal property 22 indirectly, such as via the computing device or device interface/controller via TCP/IP over the Internet (such as to a Z-Wave controller) and that computing device or device interface/controller may communicate with the item of personal property 22 via a different communication protocol. As one example, a powered bicycle trainer or treadmill may be configured as a BLE device which communicates with a laptop or desktop computing device that serves as the reporting device 28. The tracking system 30 can communicate with or "see" the trainer (by direct communication with or via a reporting app running on the reporting device 28 as noted below) via the BLE link between the reporting device 28 and the trainer (e.g. by, for example, identifying that the trainer is linked to the reporting device 28 because it is listed as a linked BLE device—which would not occur if the trainer were not in range or not linked to the reporting device 28), even though the tracking system 30 can't communicate directly with the BLE device directly via the Internet via TCP/IP. As another example, an item of personal property 22 might be configured as an RFID device, such as where an RFID tag is associated with the item (which may thus be an electronic device or might not be an electric device). The tracking system 30 can again communicate to the reporting device 28, which in turn can scan for RFID tags to read/locate the item of personal property 22.

As described, the reporting device 28 may include computer executable code or "software" in the form of a collateral reporting application. The collateral reporting application may comprise software which is stored on a memory associated with the processor 104, so as to be executable by the processor 104. For example, such a collateral reporting application may be downloaded or installed on a desktop or laptop computer, a phone/PDA/tablet or other type of computing device. The application may be configured to facilitate transmission of information received from the items of personal property 22 by the reporting device 28 to the tracking system 30 and/or to permit the tracking system to communicate with the reporting device 28 or the items of personal property associated or in communication therewith. Alternatively, such an application may be run via a web browser or the like, as described below.

The tracking system 30 preferably comprises at least one computing device, such as a server 32. The at least one server 32 may comprise a processor for executing instructions and a memory for storing data such as instructions, borrower data, collateral data and/or other information. The tracking system 30 also preferably comprises at least one communication interface 110. The communication interface 110 is configured to transmit and/or receive data or information, such as exchanged with one or more reporting devices 28 (and/or the collateral or other devices).

The tracking system 30 may include software for implementing various features of the invention. For example, the software may be configured to facilitate storage of information regarding personal property, such as used as consumer collateral (such as provided by a consumer via an application or polling, as described below). The software may also be configured to facilitate a comparison of collected personal property information to that stored information to verify the property, as also described below. In one embodiment, the software may be configured to receive information from the items of personal property 22 and/or to send signals or requests for information regarding items of personal property 22, as described below. In one embodiment of the system, the reporting devices 28 may act or serve as clients to the tracking system 30, such as in a thin client environment where the reporting device 28 serves as an interface to the tracking system 30 and the software for implementing the system is executed at the tracking system 30 (for example, as indicated above, the reporting device 28 might include a web browser which serves as an interface to and communicates with the tracking system 30 via the software run at the tracking system 30).

Information regarding personal property 22 might be provided to the tracking system 30 without a reporting device 28, such as directly, or via or through a communication interface or device 38, such as a router and/or wireless access point or a unique controller or interface 38 (such as a Z-Wave interface, such as described above). For example, as illustrated in FIG. 1, a user might have a router with wireless communication capabilities or a wireless access point and a separate router, or similar devices. For example, items of personal property 22 might communicate wirelessly with a wireless interface of a router, or with a wireless access point which is coupled to a router (where the router then serves as a communication interface to one or more communication links/remote systems or devices). In such a configuration, the communication device or interface 38 may be configured to permit communication with the items of personal property 22 and/or the tracking system 30. For example, a user might configure a port of their router (such as via security or access settings) to permit the tracking system 30 to link to the items of personal property 22 via the router (which would otherwise generally operate as a firewall to prevent those communications). In other embodiments, a user might provide an IP address and password (or other access information) which are used by the tracking system 30 to contact the router 38 and then gain access through the router to the items of personal property 22. In yet other embodiments, the items of personal property 22 might be configured so that they request that the router 38 permit communications with the tracking system 30, such as to permit the personal property 22 to send out signals to the tracking system 30 (although such a configuration may require alteration of the software associated with the item of personal property from its normal, manufacturer supplied software). These configurations have the advantage that the tracking system 30 can track the items of personal property 22 via the one or more communication interfaces or devices 38, rather than via a reporting device 28.

As another example, the item of personal property 22 might be configured as a cellular device. The tracking system 30 might then communicate directly with the item of personal property 22 via a cellular communications interface and a cellular communications network (such as using GSM, 3G/4G/5G). As yet another example, as indicated above, the item of personal property 22 might be configured as a Z-Wave or Bluetooth device and the tracking system 30 may communicate with a Z-Wave controller (which may itself be configured as an IOT device that permits direct communications via the Internet), which Z-Wave controller communicates with the one or more items of personal property via a Z-Wave protocol.

In one embodiment, as illustrated in FIG. 1, the tracking system 30 may include one or more workstations or other devices. These stations or devices may enable users to interface with the server(s) 32, such as to generate reports, view information, input queries or information or engage in other tasks.

Additional aspects of the system 20 of the invention will be appreciated from a description of methods of the invention. One embodiment of a method of the invention will be described with reference to FIG. 3. This method is described primarily with reference to a configuration of a system where a desktop or laptop computer or the like is used as a reporting device 28.

In accordance with one embodiment of the invention, a borrower may seek a loan from a lender. The loan might comprise money (represented physically, e.g. by currency, or electrically). In order to grant the loan, the lender may require that the borrower identify collateral which belongs to the borrower, which collateral might be levied upon by the lender if the borrower does not pay the loan in accordance with the terms thereof. In accordance with the invention, the system of the invention may be used to facilitate processing of the loan and tracking of associated personal property.

In a step S1, the borrower may apply for a loan. In one embodiment, this may comprise the borrower providing loan information to a lender. The loan information may comprise information which identifies the borrower (name, address, social security number, phone number, email address, birth date and/or other information) and other information, such as employment information, income information and/or other information as desired by the lender. The information might be provided aurally, in writing (such as by filling out a paper form) or electronically (such as by filling out an on-line loan application).

In order to approve the loan, the lender may require that the borrower identify collateral to be used to secure all or a portion of the loan. In a step S2, the borrower may identify various forms of collateral such as monies (retirement accounts, savings, etc.), securities (stocks, bonds), real property (land, house) and/or personal property. The lender might only accept certain forms of property as collateral, such as certain types of personal property (such as electronics but not clothing, etc.). The borrower might identify personal property by general description or by detailed information such as model number, serial number, IP address, or other unique identifier which is assigned to the item, etc., or combinations thereof.

If the lender approves the use of personal property as collateral, the lender may require that the borrower allow the lender to track that personal property. In one embodiment, the borrower may install a collateral reporting application on their reporting device, as in a step S3. For example, in one configuration a borrower might download the collateral reporting application to their home or personal computer. In a preferred embodiment, the collateral reporting application is configured to be executed by the reporting device and cause the reporting device to collect information from one or more items of personal property and report information to the tracking system.

In a preferred embodiment, the reporting device is configured to collect information regarding items of personal property which are associated with the reporting device. For example, in one configuration a borrower may place one or more items of personal property in communication with their reporting device. This might comprise, for example, establishing a wireless communication link between the item of personal property and the reporting device or via one or more communication interfaces or controllers and the reporting device or directly with the tracking system, as described above. As one example, a borrower might link their television or other electronic appliance to their home computer (such as via a wireless home computing network), link BLE devices, WiFi devices, USB devices, etc. Of course, it is possible for the borrower to place the items of personal property in communication with the reporting device via wired links, such as via a wired Ethernet connection or the like.

In a preferred embodiment, the reporting application is configured to gather or obtain information about the items of personal property, as in step S4. The reporting application could cause the reporting device to poll the items of personal property for information, such as to cause a signal to be sent to the controller of those items which causes the controllers to send back response information. In other embodiments, the reporting application could simply gather information which is received by the reporting device from those items of personal property which are placed in communication with the reporting device. For example, in some cases, when a borrower registers or places an item of personal property in communication with the reporting device, the devices may automatically exchange information which includes information about the item of personal property (such as the model and/or serial number of the item of personal property, whereby the reporting application may then gather that existing information). As noted herein, the "polling" of items of personal property may be direct, such as via direct communication from the tracking system to the items of personal property as described above, via communication from the tracking system to the item of personal property via an interface (router, Z-wave interface, etc.) or a reporting device, or via the reporting device obtaining or capturing information regarding the items of personal property and reporting that information to the tracking system, such as via a software application as described herein.

In a preferred embodiment, in a step S5, the tracking system gathers information regarding the borrower's collateral, such as the items of personal property. In one embodiment, the tracking system may send a request for information to the reporting device or through the reporting device to the items of collateral. In another embodiment, the reporting device may automatically send information regarding personal property to the tracking system.

As one example, when a borrower installs the reporting application, the collateral reporting application may automatically gather information regarding all personal property which is in communication with the reporting device. The reporting application may then automatically send a report of the located personal property to the tracking system. In another embodiment, the reporting application may report to the tracking system that it is has been installed on the borrower's reporting device and the tracking system may then request that the reporting application look for certain personal property. Alternatively, or in addition, the tracking system might communicate or poll directly one or more of the items of personal property (such by communicating with them directly via their IP address over the Internet, via a cellular network, or via the Internet to a communication interface to the device, such as a Z-Wave interface, etc.)

The tracking system may be configured to verify the personal property against the collateral identified by the borrower, as in step S6. For example, a borrower may identify "Samsung TV model XYZ, serial no. 455" and "Whirlpool refrigerator model ABC, serial no. 123" as collateral on their loan application. As such, the tracking system may either compare the personal property reported to it by the borrower's reporting device or may send a request for confirmation of the identified collateral to the reporting device. As indicated herein, the tracking system might obtain information on a variety of devices in a variety of ways. For example, the tracking system might obtain information from true IOT devices via direct communication with the device (such as via a router) or via the reporting device, might obtain information from one or more cellular devices, might identify one or more BLE devices (e.g. Wahoo Trainer Serial No. XXXX; Sonos Bluetooth Speaker ID XXXX), might identify one or more Z-Wave or Zigbee devices or the like, and might identify one or more devices via RFID tags (e.g. Tag XXXXX), etc.

In a step S7, it is determined if any of the collateral which the borrower has identified and which forms the collateral for the loan is missing. If so, then in a step S8, the lender may contact the borrower, such as to inquire what happened to the collateral. If the borrower cannot verify the collateral, the lender might require that the borrower immediately pay the balance of the loan in full.

If the collateral is verified in step S7, then the process of checking the collateral, such as in steps S4-S6, may be repeated. For example, the process of checking for the collateral and verifying the collateral might be performed at specific time intervals (e.g. each day, each hour, etc.), at irregular time intervals, or continuously. As one example, the reporting device (and associated collateral application) might be configured to register the associated personal property. In the event any of the items of personal property (or at least ones designated to be collateral for the loan) are disassociated from the reporting device, then the reporting device might automatically report that event to the tracking system. The process of verifying the collateral may continue until the term of the loan or the loan balance is paid.

In some instances, the manner of polling or communication may be varied. For example, initially a consumer might install and run a reporting application on their home computer than identifies all linked or associated devices. Such a device might comprise "Sony TV Serial No. 1234 having IP address xx.yy.zz"). Thereafter, having obtained the IP address of the device, the tracking system might communicate directly with the device. An advantage of communicating through a consumer's computing device as a reporting device 28, or using a tracking/reporting application, is additional confirmation that the consumer is in possession of the item of personal property 22. For example, the tracking system might communicate directly with an IOT television (having its own IP address), but that communication would not necessarily confirm that the television is still in the possession of a consumer. However, if the tracking application is running on the consumer's computer and the tracking application confirms that the television in linked to the consumers computer, then the consumer's possession of the television is relatively certain.

Figure 3:
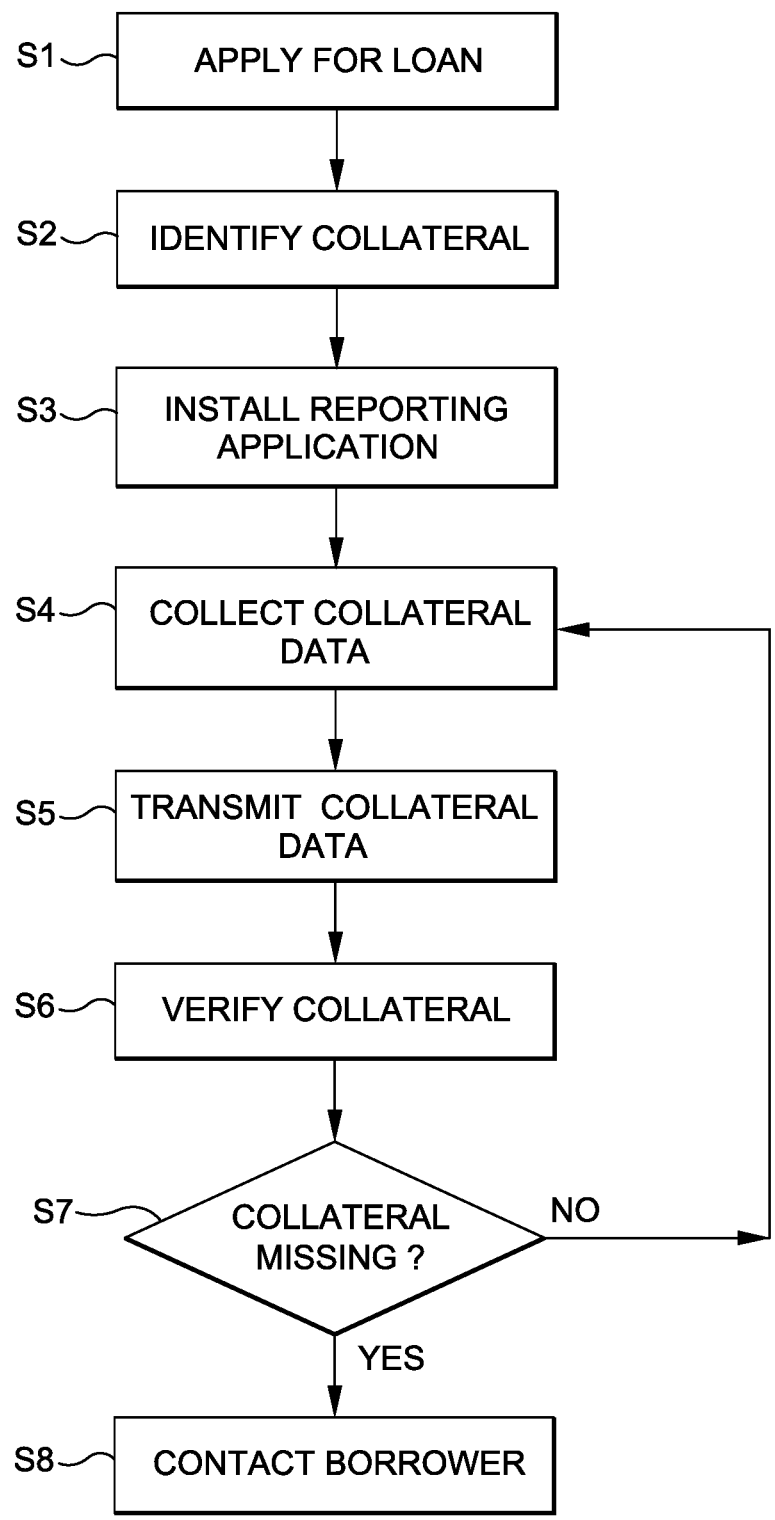
FIG. 3 is a flow diagram of a method in accordance with one embodiment of the invention.

It will be appreciated that the method illustrated in FIG. 3 is simply one example of a method of the invention and the steps thereof need not be performed in that specific order and/or that other steps may be performed. Further, the invention may have other features or elements.

For example, as described above, in one embodiment of the invention the exchange of information may be facilitated by a reporting device, such as using an application which runs on a computing device of the user. However, one drawback to such a configuration is that a user might turn their computer off from time to time. When the computer is turned off, tracking or reporting to the tracking system 30 would cease.

As another aspect of the invention, the tracking system 30 may identify the IP address of the user's computing device or communication interface or device. The tracking system 30 may utilize the IP address to determine a general geographic location of those devices (such as via a geolocation service which tracks where the IP address shows up over time), and thus the associated items of personal property 22. This information may be compared to the user's address as further verification of the location of the personal property and its association with the user. For example, a consumer might indicate on a loan application that their address is in Las Vegas, Nev. However, the tracking system 30 may determine from IP address geolocation information that the item of personal property is located near St. George, Utah. This discrepancy may be flagged, such as to contact the consumer to confirm their address and/or determine why the personal property is not at the consumer's address.

In one embodiment of the invention, locking software might be installed on items of personal property and/or a locking instruction or signal might be transmitted to items of personal property 22 to prevent use of the item(s) if their location is not confirmed. First, software might be installed (originally, by downloading or the like) on the item of personal property 22 which enables locking functionality. In one embodiment, the software may cause the item of personal property 22 to cease normal operation (shut down, disable certain features, etc.), provide a notice/warning to the user, or the like, in the event the item of personal property 22 does not communicate with the tracking system 30 or does not receive a confirmation signal from the tracking system 30 (thus indicating that the item of personal property 22 is not properly reporting to the tracking system 30, such as if the item of personal property 22 is moved out of range of the user's computer/network, the user shuts of their computer/network, etc. For example, in one embodiment, the locking software might be configured to lock the item of personal property if the software does not receive a signal from the tracking system 30 during certain time intervals (each hour, day, week, etc.). In the event the item of personal property 22 includes at least one display, the display could be configured to display a warning to the user, instructions for how to unlock the item, etc. For example, a television could display a message such as "check your computer network: we have not received reporting from your television as required by your collateral agreement . . . ". Such a locking signal might be used to prevent use of the item of personal property 22 in other situations, such as when it is determined that the item of personal property has been stolen.

The invention has particular applicability to items of personal property which include built-in communication devices, and most preferably wireless communication interfaces or devices. This personal property may include, for example, televisions, DVD players, refrigerators and other electronics which are produced with integrated communication devices which allow those devices to communicate with computers or computer networks (including communication devices/interfaces). Such devices may, for example, be placed in communication with an owner's home wireless computing network (such as a wireless access point, router and/or associated devices such as home computers, etc.). A particular advantage of this aspect of the invention is that an item of personal property can be identified and tracked without the need to attach a separate tracking device, tag or the like. Instead, the item can be tracked using the inherent capabilities of the item.

In accordance with the invention, because the tracking system can "see" items of personal property, those items can be used as collateral for a loan because the collateral can be remotely tracked by the lender. If any of the items of collateral are disassociated from the tracking system, then that event can be reported to the lender. For example, a borrower's television may be utilized as collateral and may be placed in communication with the borrower's computer or router (which in turn reports the collateral to the tracking system). If television and the borrower's computer or router communicate via a wireless connection and the borrower takes the television out of range of the borrower's computer or router/wireless network (such as if the borrower sells the television to another party and that part moves the television to a different location), the loss of the collateral (because it can no longer be "seen" by the user's computer) can be reported to or detected by the tracking system). As another example, if the borrower placed the television in communication with their computer or router via a wired communication link (such as an Ethernet cable) and then moved the television (including disconnecting the cable), then this event could again be detected or reported to the lender. As another example, the tracking system 30 might determine that certain BLE enabled devices are no longer linked to the reporting device 28 or that certain RFID tagged items of personal property 22 are no longer in range of the reporting device 28, thus indicating that the items of personal property may no longer exist or are no longer in the possession of the consumer. However, as described herein, the tracking system might be used for a wide range of other purposes and by other entities, including law enforcement, insurance companies, etc.

As one aspect of the invention, instead of having a borrower identify items of personal property on a loan application, the lender might "poll" the borrower's computer, router or other reporting device for associated personal property which could be used as collateral. For example, a borrower might fill out a loan application online via their home computer, where their computer communicates with the tracking system. During the application process, the tracking system may poll the user's computer to identify all associated devices. This polling process can be used to gather information regarding the various associated devices and then be used by the lender to identify the preferred items to be used as collateral. During the application process the user might provide access information (such as network, computer or router passwords or other information), such as to enable communication between the tracking system 30 and the items of personal property 22.

In one embodiment, various databases of information may be generated regarding borrowers, loans and/or collateral. For example, a lender may generate or create an account when a borrower fills out a loan application. That account and associated data may be stored in one or more memory devices which are accessible by the tracking system (such as the server(s)). Data may be associated with the borrower's account, such as the borrower's contact information and the like. Likewise, information may be associated with the borrower's account which identifies the borrower's collateral. As indicated, this information might be obtained by polling or interrogating the borrower's computer, router or the like for associated devices and, for example, obtaining information regarding the manufacturer, model, serial number and/or other information regarding the collateral.

In some embodiments, features of the invention may be implemented via "cookies" or other software elements. For example, in one embodiment, the tracking system 30 may generate and transmit a cookie to the item of personal property 22. The cookie might collect information associated with activity of the item of personal property 22 (such as associated with a controller of the item of personal property 22, such as when the controller syncs to external devices or systems, such as for updating the software code thereof, verifying warranty information etc.). More importantly, the cookie may store identification information for the item of personal property. In this configuration, when the tracking system 30 polls or interrogates for information regarding the item of personal property, it may collect information from the cookie stored in a memory of the item of personal property 22. This information may be used to verify the item of personal property 22.

In one embodiment, the tracking system 30 might be used to poll items of personal property 22 initially. Thereafter, the items 22 might be reconfigured to self-report, either directly or via the reporting device 28. For example, the reporting device 28 might be configured (such as via a downloaded application) to automatically periodically gather and report information about linked or associated items of personal property 22 to the tracking system 30. In another embodiment, the items of personal property 22 might be configured to do so (again, such as via a downloaded application when the item of personal property 22 includes a controller and memory that is configurable to store an application and run such software).

It will be appreciated that the system of the invention may be used to track the collateral of multiple borrowers. For example, a single tracking system could be used to communicate with the reporting devices of a plurality of borrowers. In this manner, the collateral verification by a lender as to multiple borrowers can be integrated and automated.

In one embodiment, the invention may be implemented via a reporting application which is installed on the borrower's computing device or via interface with a computer, communication interface or device or the like. Of course, the invention might be implemented in various other manners.

In one embodiment, the borrower's reporting device may be configured to periodically contact the tracking system to report the collateral, or might be configured to contact the tracking system only if an item of collateral is no longer detected. In an alternate configuration, the tracking system may poll the reporting device for collateral verification. In another embodiment, the tracking system may be configured to receive signals which are periodically transmitted from collateral (for example, an item of collateral might be configured to periodically send a signal which seeks a software update from the manufacturer or the like and the tracking system 30 may detect that signal as a means for determining the existence of the collateral).

It will be appreciated that the reporting application, reporting device and/or tracking system may be configured to track only the items of personal property which are used as collateral. For example, a borrower might have a television and a DVD player linked to their home computer or communication interface/device, but only the television might be used as collateral for a loan. In such a configuration, the tracking system may poll the borrower's computer or send a request through a communication interface/device for just the television and/or the borrower's computer might be configured to report that the television is still connected (or is no longer detected), but not report the DVD player. However, in other situations, all personal property of a person or entity might be tracked or polled (for example, when doing an asset determination, insurance inventory, etc., as described below).

Another aspect of the invention comprises a method and system for creating personal property 22 records. Such records may be used to confirm, track and/or record the existence, status and/or other information regarding personal property, such as information regarding the location of personal property.

In one embodiment, a record may be created for an item of personal property 22. The record might be created at the time an item of personal property 22 is manufactured or first sold, or might be created at a later date, such as in support of a desired transaction. The record might thus be created by, or at the request of, a manufacturer of an item of personal property 22, the purchaser or owner of the personal property, a lender, or other entity. As described, various information may be associated with the record, such as information which identifies the item of personal property. The record may also include information regarding later owners of the personal property 22, information regarding the location of the item of personal property at one or more times, etc.

One embodiment of the invention will be described with reference to FIG. 4. As illustrated therein, a system or environment 200 may comprise one or more entities 24, such as persons, that own or possess items one or more items of personal property 22. As with the system 20 described above, the system or environment 200 may include a system 30 for tracking such personal property 22. These features are not re-described here, but may be the same or similar to those of the system 20 described above.

In accordance with the invention, various entities may be configured to communicate with one another, such as via one or more networks 80. Such a network 80 might comprise the Internet, other types of networks (private/public LANs, WANs, wireless or wired networks) or combinations thereof. Via the network 80, entities such as one or more banks 40 (or other types of lenders), manufacturers 50, vendors 60 and the like, may communicate. For example, such entities 40, 50 and 60 may have one or more computing or communication devices, such as computers, servers, tablets, mobile devices or the like, which can transmit information to and receive information from, the network 80. Further, other devices or systems might communicate via the network 80, such as personal computing devices 70. As described above, a reporting device 28 and the tracking system 30 might also communicate via the network 80.

In one embodiment, the elements of the system or environment 200 might include software (e.g. machine-readable code stored in a memory and executable by a processor) for facilitating the functionality described herein.

In one embodiment, the system or environment 200 includes one or more personal property records 90. Such records 90 may have various forms and be stored in various manners, such as by comprising data stored in one or more data storage devices (such as memory devices) associated with one or more computing devices. In a preferred embodiment, the records 90 comprise blockchains. In such a configuration, the record 90 may comprise a genesis block 92 and one or more subsequent blocks 94, of information. As is known in the art of block chaining, such blocks of information may be linked using cryptography, and where information is recorded or stored across many computers.

Figure 4:
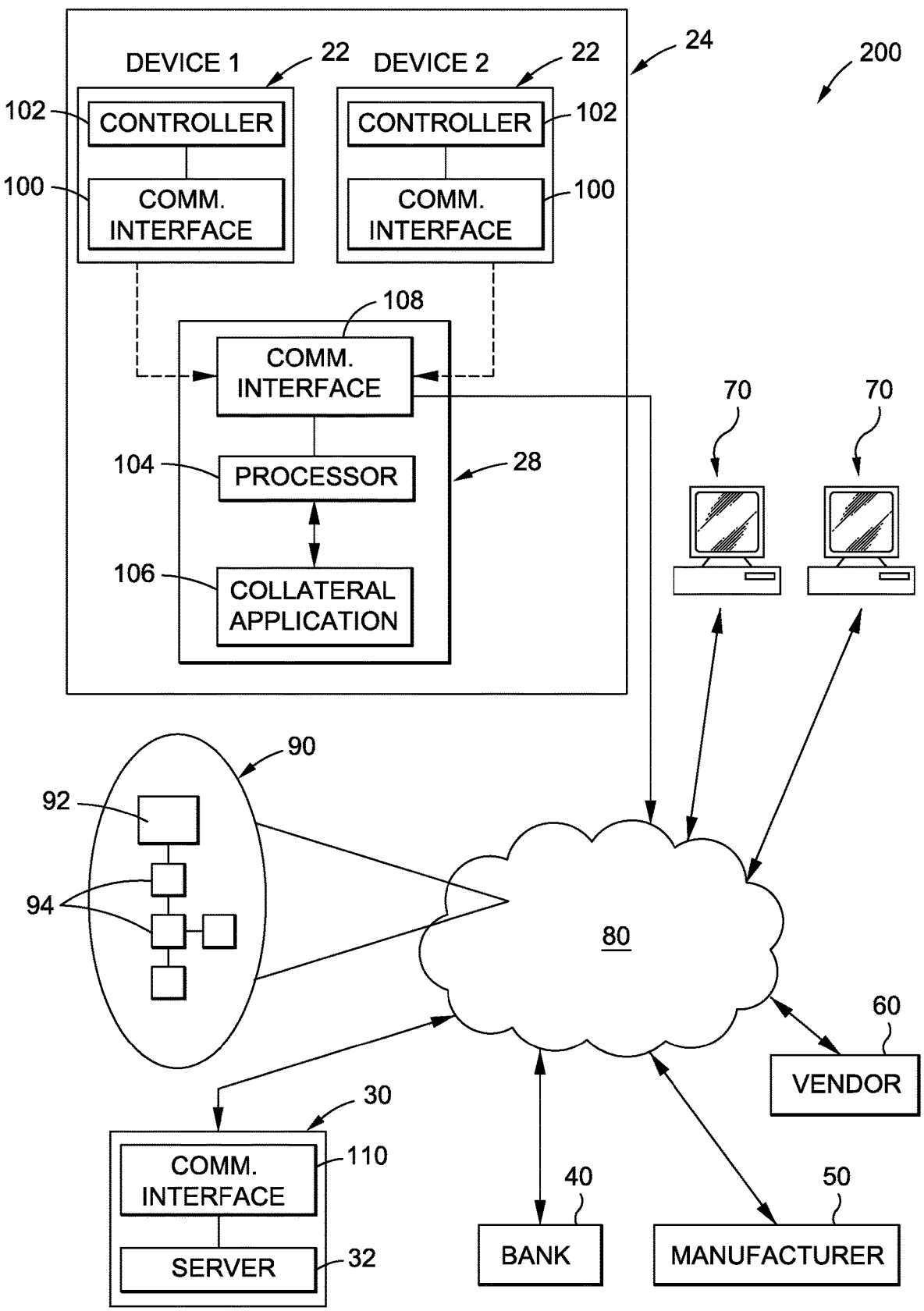
FIG. 4 is an overview of another configuration of a system in accordance with another embodiment of the invention.

Of course, the system or environment 200 illustrated in FIG. 4 is just one example of a system or environment 200 of the invention and the system or environment 200 might include additional elements or fewer elements.

Additional aspects of the invention will be described with reference to FIG. 5, which illustrates a method flow in accordance with an embodiment of the invention. In a step S1, a record is created. This record might comprise, for example, a genesis block (often referred to as "block 0") of a blockchain. The genesis block contains first information regarding an item of personal property and a timestamp. In one embodiment, the first information might comprise information which confirms the creation or existence of the item of personal property, such as one or more of: a description of the item, its date of manufacture, a serial number or other identifier, the manufacturer, model number, location of manufacture, etc. As indicated at S1a, the first information might be provided by a manufacturer and might comprise, for example, "root of trust" or "ROT" information. However, the information could be provided by other entities. As one example, Sony might manufacture a 60" flat panel plasma TV, Model S2024 TV and assign that TV root of trust information Serial Number XYZ123, having ID 789ABC, and create or have created the genesis block for such TV when the TV is added to the Sony "manufactured product" inventory, such as Jan. 1, 2020. The information might comprise the IP address for the item or other protocol identifiers, including identifiers for a particular communication protocol such as ZigBee, and other identifiers such as IOT protocol identifiers that may identify the item, type of item, etc.

Figure 5:
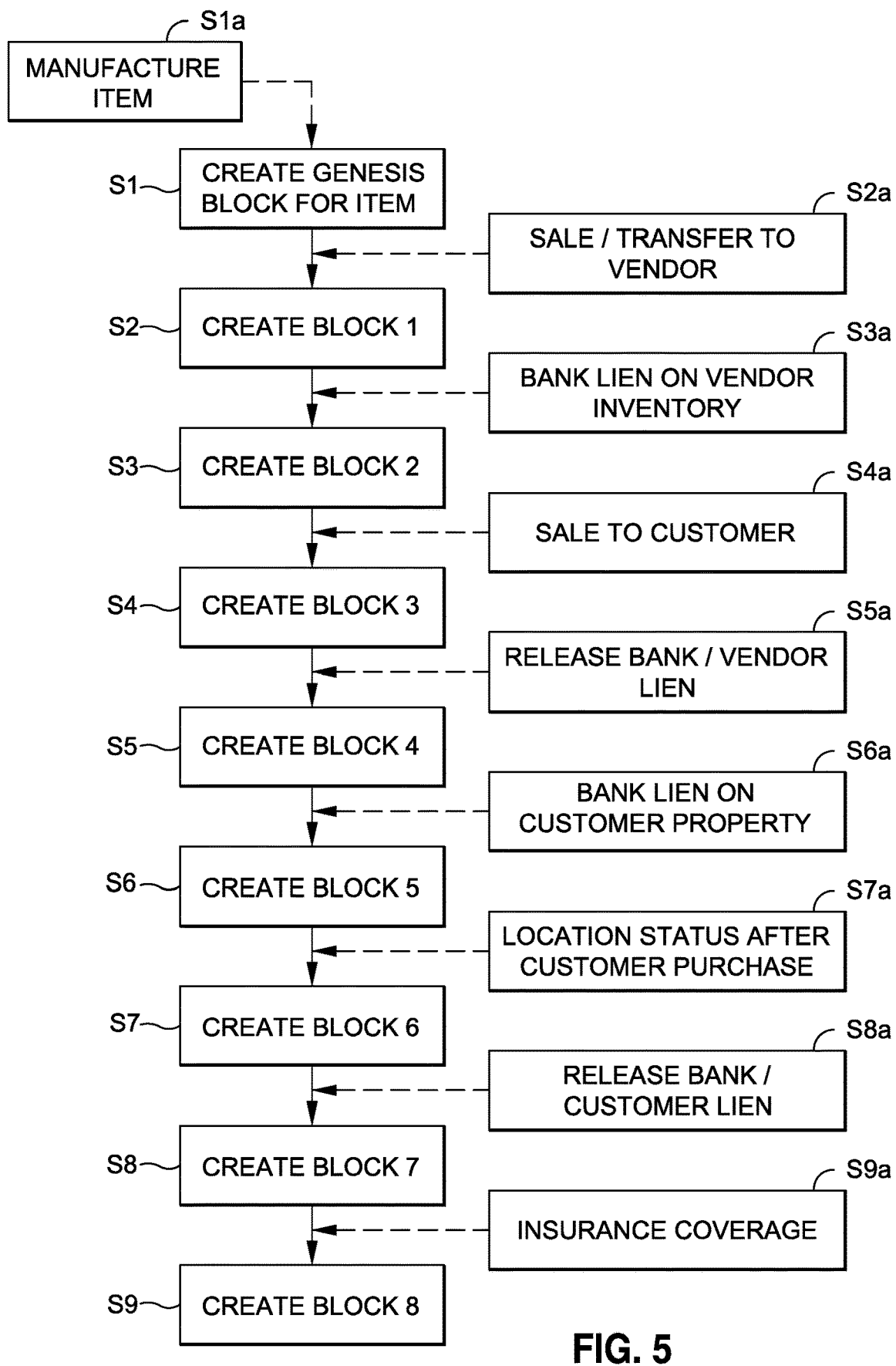
FIG. 5 is a flow diagram of a method in accordance with another embodiment of the invention.

FIG. 5 illustrates an embodiment where, after the item of personal property is manufactured, it is transferred to a vendor for sale, as at S2a. At a step S2, a block 1 may then be created as part of the blockchain off of the genesis block. This block might contain second information regarding the item of personal property, a second timestamp, and a hash of the genesis block. The second information might comprise, for example, information confirming the transfer of possession or ownership of the item of personal property from the manufacturer to the vendor. This information might again comprise information which identifies the item of personal property, information regarding the parties, the transfer date or the like. As one example, Best Buy might buy or acquire the above-referenced TV from Sony. Block 1 might thus contain information regarding the transfer, such as information that the designated TV was transferred from Sony to Best Buy on Feb. 1, 2020.

In the illustrated example, at S3a a bank or other lender might have a lien on the inventory of the vendor. The bank might thus wish to record information about that lien in association with the item of personal property, such as via block 2, as at Step S3. Block 2 might contain third information regarding the item of personal property, a third timestamp, and a hash of the previous blocks. The third information might comprise, for example, information confirming the lien against the item of personal property, including the name of the bank, date of the lien, etc. As one example, Chase Bank might have a lien on all Best Buy inventory. Block 2 might thus contain information regarding the line, such as information that the designated TV is covered by the lien as of a particular effective date, information regarding the bank, etc.

At S4a, the vendor might sell the item of personal property. At a step S4, a block 3 may then be created as part of the blockchain. This block might contain fourth information regarding the item of personal property, a fourth timestamp, and a hash of the previous blocks. The fourth information might comprise, for example, information confirming the transfer of possession or ownership of the item of personal property from the vendor to the customer. This information might again comprise information which identifies the item of personal property, information regarding the parties, the transfer date or the like. As one example, Best Buy might sell the above-referenced TV to John Doe. Block 3 might thus contain information regarding the transfer, such as information that the designated TV was transferred from Best Buy to John Doe on Feb. 15, 2020 (including information regarding the parties, such as addresses or other information).

At S5a, in view of the sale of the item from the vendor to customer, the bank may release the vendor inventory lien. At a step S5, a block 4 may then be created as part of the blockchain. This block might contain fifth information regarding the item of personal property, a fifth timestamp, and a hash of the previous blocks. The fifth information might comprise, for example, information confirming the release of the vendor inventory lien, such as information which identifies the item of personal property, information regarding the parties, the lien release or the like. In the example above, the block might comprise information that Chase Bank is releasing the inventory lien in favor of Best Buy relative to the TV (including details of the TV).

At S6a, if the customer finances the purchase of the item, such as the above-referenced TV, a bank or other finance entity/lender might place a lien on the item. At a step S6, a block 5 may then be created as part of the blockchain. This block might contain sixth information regarding the item of personal property, a sixth timestamp, and a hash of the previous blocks. The sixth information might comprise, for example, information about the finance lien on the item. This information might again comprise information which identifies the item of personal property, information regarding the parties, the lien, lien date, lien amount or the like. As one example, CitiBank might finance the consumer's purchase of the Sony TV detailed above, wherein block 5 may thus contain information regarding Citibank's lien on the TV in security of the financed amount, the customer's name and/or other identifying information or the like.

At step S7, information regarding the status of the item of personal property might be associated with the blockchain. In one embodiment, this might comprise location status information, such as determined using the method and system described herein. For example, after the finance company has financed the purchase of the item, they may use the system herein to ensure that the customer is still in possession of the item, as at S7a. At a step S7, a block 6 may then be created as part of the blockchain. This block might contain seventh information regarding the item of personal property, a seventh timestamp, and a hash of the previous blocks. The seventh information might comprise, for example, information about the location of the item. This might comprise information which confirms that the item is in the possession of the customer (including the information verifying this fact, such as against the customer's address, etc.) or might comprise information that indicates that the item is not confirmed to be in the possession of the customer, such as by being located elsewhere. This information might again comprise information which identifies the item of personal property, information regarding the parties, and the location information, such as the information which is generated or obtained using the system and method described herein.

At S8a, if the customer pays off any credit/loan associated with financing of the item, any associated lien may be released. At a step S8, a block 7 may then be created as part of the blockchain. This block might contain eighth information regarding the item of personal property, an eighth timestamp, and a hash of the previous blocks. The eighth information might comprise, for example, information about the release of the consumer finance lien on the item. This information might again comprise information which identifies the item of personal property, information regarding the parties, the lien, lien release date, etc.

Of course, various other transactions, events or information might be associated with the record, including one or more blocks. The events or information described above are merely exemplary and might comprise other information or lesser information or events, other sequences or the like. For example, the record might not include liens, if no liens are granted or if the grantor does not wish to have such liens are part of the record. The record might comprise other sales, such as subsequent sales or transfers of the item. The record might include multiple location checks, such as checks of the location of the property different times (or periodically), such as using the system and method described herein.

Further, the order of events may be entirely different than the order identified in FIG. 5 (wherein the order of events is merely exemplary).

It will also be appreciated that the record might be created by different entities, particularly in the case of blockchain records where the records or blocks do not need to be created by a single authority. For example, relative to the example in FIG. 5, each of the parties (manufacturer, vendor, bank/lender, customer, etc.) might hire a third party to create the blockchain blocks. For example, a manufacturer might transmit information regarding a number of products manufactured each day, week, month (or other period) to a "title company" which creates genesis blocks for each of the newly manufactured products. A vendor might have the "title company" check the blockchain for information regarding manufactured products when the vendor is purchasing them, and then have that third party update the title based upon the vendor's purchase. However, the entities might themselves directly create the blocks.

It will be appreciated that the method and system of the invention has numerous other benefits and uses. For example, location verification and/or personal property record information may be used for a variety of purposes.

As one example, an insurance company might use the system herein to verify a customer's ownership of property. This might be performed as part of issuing an insurance policy (to determine what property exists and/or the customer is seeking to be covered), part of processing a claim (for example, to confirm that property that the insured says they owned was owned and/or possessed by them) and/or to confirm ownership/possession after a policy has issued. For example, relative to the issuance of a new policy, an insurance company might check personal property records generated in accordance with the invention to determine property which the records show is owned by the insured and is in the possession of the insured. In addition, or alternatively, the insurance company might do a personal property location verification, such as in accordance with the method and system herein. For example, the insurance company (or verification company) might do a collateral or personal property verification, thus obtaining information about items of personal property that the customer owns. This might identify, for example, various IOT devices of the insured, such as computers, televisions and various other devices. The identification of such property may be obtained, along with location confirmation, thus allowing the insurance company to inventory the property that they are to insure. As indicated, a similar process may be used to verify assets or property of the insured in the event of a loss, etc.

In one embodiment, insurance information might be similarly associated with the record for the item of personal property. Referring again to FIG. 5, at S9a, an insurance company might issue an insurance policy on an item of personal property. At a step S9, a block 8 may then be created as part of the blockchain. This block might contain ninth information regarding the item of personal property, a ninth timestamp, and a hash of the previous blocks. The ninth information might comprise, for example, information which identifies the item of personal property, information regarding the parties, the insurance coverage and the like.

As another example of an implementation of the present invention, a company that owns a large amount of equipment might wish to obtain a working capital loan from a lender. Typically, the lender will wish to verify the assets of the company as part of determining the risks associated with the loan, including in comparison to the amount of to be loaned. The lender might thus seek an asset list from the company (thus risking that the asset list is inaccurate) or have an employee travel to the company to prepare an asset list (which is expensive). In accordance with the present invention, the lender might use the system and method herein to perform an automated inventory of personal property of the company. This inventor could provide the lender with information regarding the personal property of the company (such as information regarding the various IOT devices, such as computers, TVs, monitors, printers, copiers, etc., including by serial number or other identifier) as well as confirmation of the location of the assets (and thus the possession thereof by the lender). Alternatively, or in addition, the lender might conduct a review of personal property records as generated herein in order to determine personal property owned by the company, including information about the property, its recorded location, any liens, etc.

As indicated herein, the system and method of the invention have particular utility to tracking of collateral for loans, it could be used for various purposes. For example, instead of using the system to track collateral which is used as security for a general loan, the system could be used to track a particular item of personal property which has been purchased on credit. For example, a borrower might purchase a refrigerator on credit. The system of the invention might be used to track the refrigerator during the period of time that the borrower is paying off the refrigerator, thus making sure that the borrower does not sell, destroy, etc., the purchased item until it has been paid. The system could also be used to track personal property for insurance or other purposes.

As another example, if an item of personal property is stolen, the system and method of the invention may be used to determine the present location of the item. This information, such as the IP address, might be used by law enforcement to recover the property for the owner.

The invention has numerous advantages, including overcoming the problems noted above. For example, the borrower now no longer needs to bring collateral to the lender and the lender no longer needs to store the collateral, and the borrower can still use the collateral.

Another advantage of the invention is a universal, secure/reliable personal property record system. The system is not tied to a particular entity, such as a particular governmental entity or agency in a particular geographic location. In the preferred embodiment where the property record comprises a block chain, the record can be accessed by any entity, anywhere. Further, the record is reliable, wherein when using a block chain, the record cannot be manipulated. In accordance with the invention, the accuracy of the record can thus be ensured, such as for confirming the existence, ownership, location, etc. of property. Further, the method and system provide new functionality that allows not only a record that confirms the existence of property, or its owner, to be determined, but a system where the location of the property can be determined, including by tracking the location of the property.

It will be understood that the above described arrangements of apparatus and the method there from are merely illustrative of applications of the principles of this invention and many other embodiments and modifications may be made without departing from the spirit and scope of the invention as defined in the claims.

What is claimed is:

1. A system for tracking and recording information regarding an item of personal property of an owner, the item of personal property having a built-in communication interface, comprising:

at least one external server comprising a processor, a memory and machine-readable code stored in said memory and executable by said processor to cause said server to:
 receive information regarding said item of personal property and create a record regarding said item of personal property, including information which identifies said item of personal property;
 establish a communication link between said at least one external server and said item of personal property via a communication device of said owner, said communication device communicatively coupled to said built-in communication interface of said item of personal property;
 send a request to said item of personal property via said built-in wireless communication device thereof;
 utilize a response to said request to identify a location of said item of personal property; and
 update said record regarding said item of personal property with information regarding said location of said item of personal property at a first time.

2. The system in accordance with claim 1 wherein said record comprises a block chain, wherein information which identifies said item of personal property and said information regarding said location of said item of personal property is associated with one or more blocks of said block chain.

3. The system in accordance with claim 1 wherein said information regarding said item of personal property is obtained from a manufacturer of said item of personal property.

4. The system in accordance with claim 3 wherein said information which identifies said item of personal property comprises at least one of: a) a description of said item of personal property, b) a manufacture date; c) the manufacturer; d) a serial number; e) a model number; f) an IP address; and g) a unique identifier for said item of personal property.

5. The system in accordance with claim 1 wherein said machine-readable code stored in said memory and executable by said processor further causes said server to update said record regarding said item of personal property with information regarding at least one of: a) a transfer of ownership of said item of personal property and b) a lien placed upon said item of personal property.

6. The system in accordance with claim 1 wherein said item of personal property comprises an IOT device.

7. The system in accordance with claim 1 wherein said location is determined from an IP address received in response to said request.

8. The system in accordance with claim 1 wherein machine-readable code stored in said memory and executable by said processor further causes said server to:
 send a second request to said item of personal property via said built-in wireless communication device thereof;
 utilize a response to said second request to identify a location of said item of personal property; and
 update said record regarding said item of personal property with information regarding said location of said item of personal property at a second time.

9. A method of creating a record of information regarding an item of personal property, the item of personal property having a built-in wireless communication interface, comprising the steps of:
 creating a record of information which identifies said item of personal property, including at least a first owner thereof; and associating information with said record which identifies a location of said personal property at a first time, comprising:

establishing a communication link between a communication device of an external server and said built-in wireless communication device of said item of personal property via a communication device of said owner, said communication device comprising a router;

transmitting a request from said server to said item of personal property via said communication link;

receiving at said server, a response from said item of personal property transmitted from said built-in wireless communication interface thereof through and said communication device via said communication link; and utilizing said response to identify a location of said item of personal property.

10. The method in accordance with claim 9 wherein said step of creating a record comprises creating a block of a block chain.

11. The method in accordance with claim 10 wherein said step of associating information with said record comprises creating another block of said block chain.

12. The method in accordance with claim 9 comprising receiving said information which identifies said item of personal property from a manufacturer of said item of personal property.

13. The method in accordance with claim 12 wherein said information which identifies said item of personal property comprises at least one of: a) a description of said item of personal property, b) a manufacture date; c) the manufacturer; d) a serial number; e) a model number; f) an IP address; and g) a unique identifier for said item of personal property.

14. The method in accordance with claim 9 further comprising updating said record regarding said item of personal property with information regarding at least one of: a) a transfer of ownership of said item of personal property and b) a lien placed upon said item of personal property.

15. The method in accordance with claim 9 wherein said item of personal property comprises an IOT device.

16. The method in accordance with claim 9 wherein said location is determined from an IP address received in response to said request.

\* \* \* \* \*